Patented May 31, 1949

2,471,794

UNITED STATES PATENT OFFICE 2,471,794

MANUFACTURE OF COLORING MATTERS OF THE PHTHALOCYANINE SERIES FROM PHTHALYL HALIDES

Robert J. Sumner, Manchester, N. H., assignor to Roberts Chemical Company, Perth Amboy, N. J.

No Drawing. Application July 15, 1948, Serial No. 38,950

5 Claims. (Cl. 260—314.5)

This invention relates to the manufacture of coloring matters of the phthalocyanine series.

Phthalocyanine coloring matters and particularly copper phthalocyanine have become commercially important particularly in the pigment field because of their outstanding brilliance of shade and fastness properties.

Two general commercially feasible methods are known for the preparation of phthalocyanine coloring matters. These methods involve the use of phthalic anhydride or a phthalonitrile as intermediates.

Those methods which involve the use of a phthalonitrile as the intermediate for phthalocyanine formation suffer from the disadvantage that the preparation of the dinitrile is difficult and expensive and in some cases the yields are so low that practical application becomes impossible. Thus, the usual method for the preparation of phthalonitrile is through the reaction of phthalic anhydride with ammonia in the vapor phase. This process involves very expensive equipment and is difficult to control to give the desired product in good yield. Furthermore, the vapor phase reaction is not adaptable for the production of highly substituted phthalonitriles where the lack of volatility of the intermediate anhydride precludes its use.

The alternative methods of phthalocyanine preparation which use a phthalic anhydride as the intermediate are disadvantageous because the yields are low, the product quality is difficult to control and the processes are not adaptable to the manufacture of certain very desirable chlorine containing products such as hexadecachloro-copper-phthalocyanine.

The present invention aims to provide a simple, practical, economic, and novel process for the manufacture of phthaolocyanine coloring matters which contain copper.

A particular object of this invention is the preparation of copper phthalocyanines in excellent yields from readily available materials by a process which gives easily controlled reaction and product characteristics and gives substituted products which are unobtainable by the previously described processes.

The objects of this invention are accomplished by the reaction of a phthalyl chloride or bromide and a cupriferous reagent with urea or biuret.

The phthalyl chlorides or bromides of the present invention may contain various nuclear substituents. Thus, 4-nitrophthalyl chloride, 4-chlorophthalyl chloride, 3,4-dichlorophthalyl bromide, 3-bromophthalyl chloride, 3,4,5,6-tetrachlorophthalyl chloride, and other similar compounds are amenable to this process.

It is thus obvious that the copper phthalocyanines which may be produced by the process of this invention include copper phthalocyanine, tetranitro-copper-phthalocyanine, tetrachloro-copper-phthalocyanine, octachloro-copper-phthalo-cyanine, tetrabromo-copper-phthalocyanine, hexadecachloro-copper-phthalocyanine, and other similar substituted phthalocyanines.

The cupriferous reagents which may be suitably used are metallic copper powder, copper sulfate, cupric chloride, cuprous chloride, cupric oxide, etc. These reagents should be preferably though not necessarily anhydrous. The amount of these reagents required in this process is slightly over that theoretically required. Lesser amounts give lower yields while larger amounts offer no advantage.

The amount of urea or biuret necessary to carry out the process of this invention varies over wide limits. The most advantageous usage is between two and five parts per part of the phthalyl halide. Lesser amounts give lower yields while larger amounts offer no advantage and are therefore wasteful.

Although the reaction may be carried out by heating a mixture of phthalyl chloride or bromide, urea or biuret, and a cupriferous reagent, it may also, in some cases, be advantageously done in the presence of a solvent. Among the solvents which may be used to advantage are nitrobenzene, o-dichlorobenzene, trichlorobenzene, naphthalene, and alphachloronaphthalene.

A considerable advantage of this process is that temperature control is not critical. The reaction proceeds smoothly within the range 140°–275° C. Optimum reaction temperature will, of course, vary somewhat with the reagent and solvent employed and the time and speed of the reaction desired. In most cases optimum results will be obtained within the preferred temperature range of 175°–210° C.

The reaction may in some cases be advantageously catalyzed by boric acid or ammonium molybdate.

Various attempts have been made to determine the mechanism of the process of this invention. These attempts have involved efforts to isolate the intermediate products in the reaction. All these attempts have failed. It is therefore impossible to limit the present invention to any particular reaction theory.

The copper phthalocyanines produced by the process of this invention are readily purified and are characterized, after acid pasting by conventional means, by great brilliance of shade and high tinctorial strength.

The invention will be illustrated in greater detail in conjunction with the following specific examples. The parts are by weight.

*Example 1*

A mixture of 20.3 parts of phthalyl chloride, 50 parts of urea, and 3.5 parts of cupric chloride is heated at 195°–200° C. until pigment formation is complete. The product thus obtained is crushed, washed with alcohol, dilute sodium hydroxide, and water. The yield and quality of the copper phthalocyanine thus formed are excellent.

*Example 2*

A mixture of 20.3 parts of phthalyl chloride, 30 parts of urea, 3.5 parts of cupric chloride and 100 parts of trichlorobenzene is heated at 195°–200° C. until pigment formation is complete. The reaction mixture is filtered and the product washed successively with alcohol, dilute sodium hydroxide, and water. The copper phthalocyanine thus obtained may be dried and acid pasted by conventional means. The yield is excellent.

*Example 3*

A mixture of 20.3 parts of phthalyl chloride, 35 parts of urea, 3.5 parts of cupric chloride, 100 parts of trichlorobenzene, and 0.2 part ammonium molybdate is heated at 195°–200° C. until pigment formation is complete. The copper phthalocyanine is isolated as in Example 2.

*Example 4*

A mixture of 20.3 parts of phthalyl chloride, 40 parts of biuret, 3.5 parts of cupric chloride, 0.2 part of ammonium molybdate, and 100 parts of alpha-chloronaphthalene is heated at 195°–200° C. until copper phthalocyanine formation is complete. The pigment thus formed is isolated as described in Example 2.

*Example 5*

A mixture of 20.3 parts of phthalyl chloride, 40 parts of biuret, 4.1 parts of anhydrous copper sulfate, and 100 parts of nitrobenzene are heated at about 190° C. until copper phthalocyanine formation is complete. The product is isolated as described in Example 2.

*Example 6*

A mixture of 29.6 parts of phthalyl bromide, 40 parts of urea, 3.5 parts of cupric chloride is heated at about 220° C. until pigment formation is complete. The copper phthalocyanine thus obtained is isolated as described in Example 1.

*Example 7*

A mixture of 34.1 parts of 3,4,5,6-tetrachlorophthalyl chloride, 55 parts of urea, 3.5 parts of cupric chloride, 0.1 part of ammonium molybdate and 100 parts of trichlorobenzene is heated at 195°–200° C. until pigment formation is complete. The hexadecachloro-copper-phthalocyanine so formed is isolated as described in Example 2.

What I claim is:

1. The process for preparing a copper phthalocyanine which comprises heating together a phthalyl halide, the halogen atoms of which have an atomic weight of at least 35 and not more than 80, a cupriferous reagent and a member of the group consisting of urea and biuret.

2. The process for preparing copper phthalocyanine which comprises reacting phthalyl chloride with a cupriferous reagent and urea.

3. The process for preparing copper phthalocyanine which comprises reacting phthalyl chloride with cupric chloride and urea.

4. The process for preparing hexadecachloro-copper-phthalocyanine which comprises reacting 3,4,5,6-tetrachlorophthalyl chloride with a cupriferous reagent and urea.

5. The process for preparing hexadecachloro-copper-phthalocyanine which comprises reacting 3,4,5,6-tetrachlorophthalyl chloride with cupric chloride and urea.

ROBERT J. SUMNER.

REFERENCES CITED

The following references are of record in the file of this patent:

UNITED STATES PATENTS

| Number | Name | Date |
|---|---|---|
| 2,197,459 | Wyler | Apr. 16, 1940 |
| 2,414,374 | Haddock et al. | Jan. 14, 1947 |